United States Patent [19]

Brownlow et al.

[11] Patent Number: 6,064,362
[45] Date of Patent: May 16, 2000

[54] ACTIVE MATRIX DISPLAY

[75] Inventors: Michael James Brownlow, Oxford; Toshio Nomura, Kidlington, both of United Kingdom; Yasushi Kubota, Sakurai; Masahiro Adachi, Nara, both of Japan

[73] Assignee: Sharp Kabushiki Kaisha, Osaka, Japan

[21] Appl. No.: 08/848,132

[22] Filed: Apr. 28, 1997

[30] Foreign Application Priority Data

May 1, 1996 [GB] United Kingdom .................. 9609064

[51] Int. Cl.[7] .............................. G09G 3/36; G09G 5/00
[52] U.S. Cl. .............................. 345/98; 345/90; 345/92; 345/205
[58] Field of Search .......................... 345/98, 100, 90, 345/92, 205, 206; 257/59; 341/122; 358/236; 340/784; G02F 1/136

[56] References Cited

U.S. PATENT DOCUMENTS

| | | | |
|---|---|---|---|
| 4,591,848 | 5/1986 | Marozumi et al. | 340/784 |
| 4,635,127 | 1/1987 | Togashi | 358/236 |
| 5,426,430 | 6/1995 | Schlig | 341/122 |
| 5,459,483 | 10/1995 | Edwards | 345/98 |
| 5,589,847 | 12/1996 | Lewis | 345/98 |
| 5,650,636 | 7/1997 | Takemura et al. | 257/59 |
| 5,680,149 | 10/1997 | Koyama et al. | 345/98 |
| 5,701,136 | 12/1997 | Huq et al. | 345/100 |
| 5,726,678 | 3/1998 | Dingwall | 345/100 |
| 5,812,106 | 9/1998 | Hughes | 345/90 |

FOREIGN PATENT DOCUMENTS

| | | |
|---|---|---|
| 0586155 | 3/1994 | European Pat. Off. . |
| 5142573 | 6/1993 | Japan . |

OTHER PUBLICATIONS

F. Okumura et al., AM–LCD 94, pp. 24–27, 1994, "Dynamic Leakage Current Reduction Poly –Si TFTs for AMLCDs".
T. Leroux, Japan Display '89, pp. 416–417, 1989, "Reponse Time of Active Matrix LCDs.".
T. Onozawa et al., Japan Display '89, pp. 576–579, 1989, "Dynamical Electro–Optical Characteristics in an Active Matrix Addressed TN–LCD.".
A. G. Lewis et al., IEEE Journal of Solid–State Circuits, vol. 27, No. 12, pp. 1833–1842, 1992, "Polysilicon TFT Circuit Design and Performance.".

Primary Examiner—Richard A. Hjerpe
Assistant Examiner—Benjamin D. Bowers
Attorney, Agent, or Firm—Renner, Otto Boisselle & Sklar

[57] ABSTRACT

An active matrix liquid crystal display includes a rectangular array of picture elements driven by data and scan drivers. Each picture element includes a liquid crystal display element connected to the output of a unity gain buffer amplifier. The input of the amplifier is connected to a hold capacitor and to series connected gate transistors. The gates of the transistors are connected to a scan electrode and the transistors are connected in series between a data electrode and the input of the amplifier. The output of the amplifier is connected to the connection between the transistors.

13 Claims, 10 Drawing Sheets

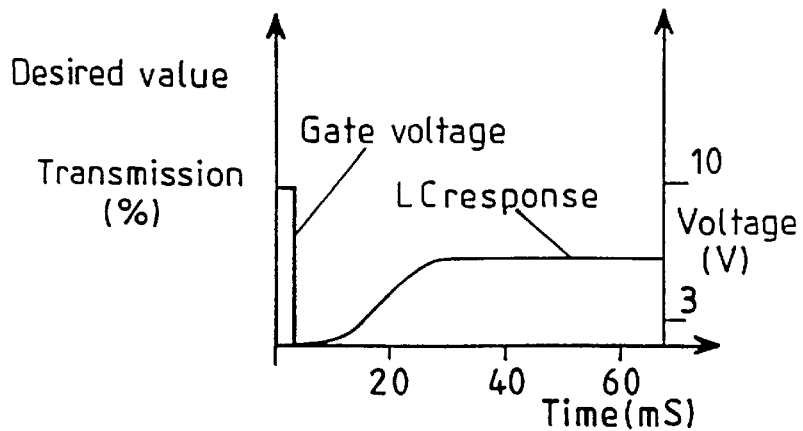
FIG 3a: LC transmission response - single impulse charging
PRIOR ART
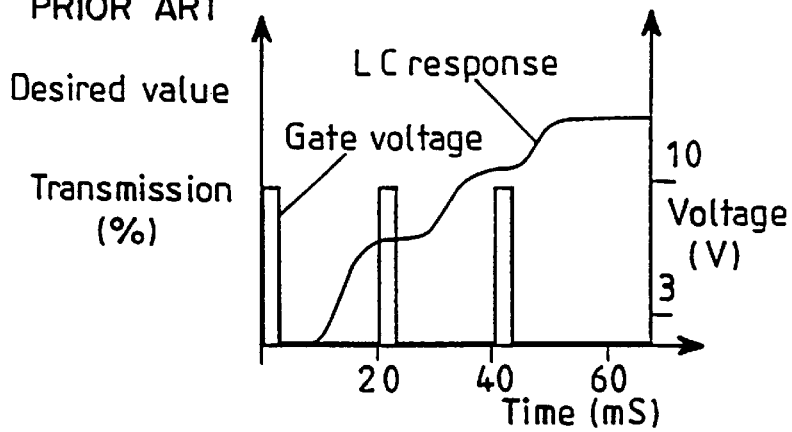
FIG 3b: LC transmission response - multiple impulse charging
PRIOR ART
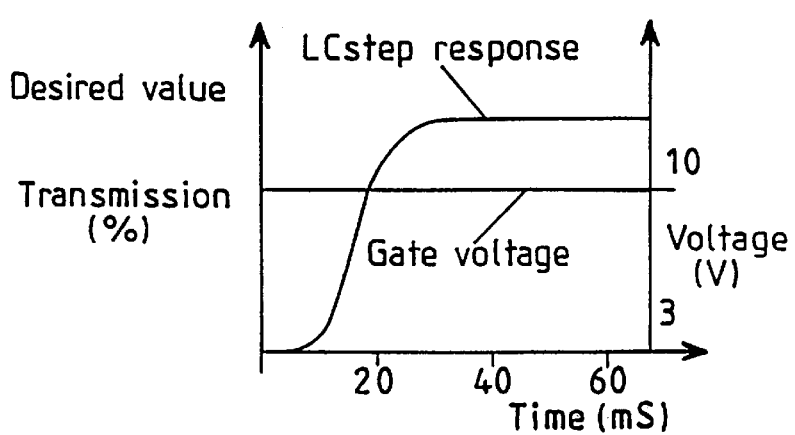
FIG 3c: LC transmission response - voltage step response
PRIOR ART

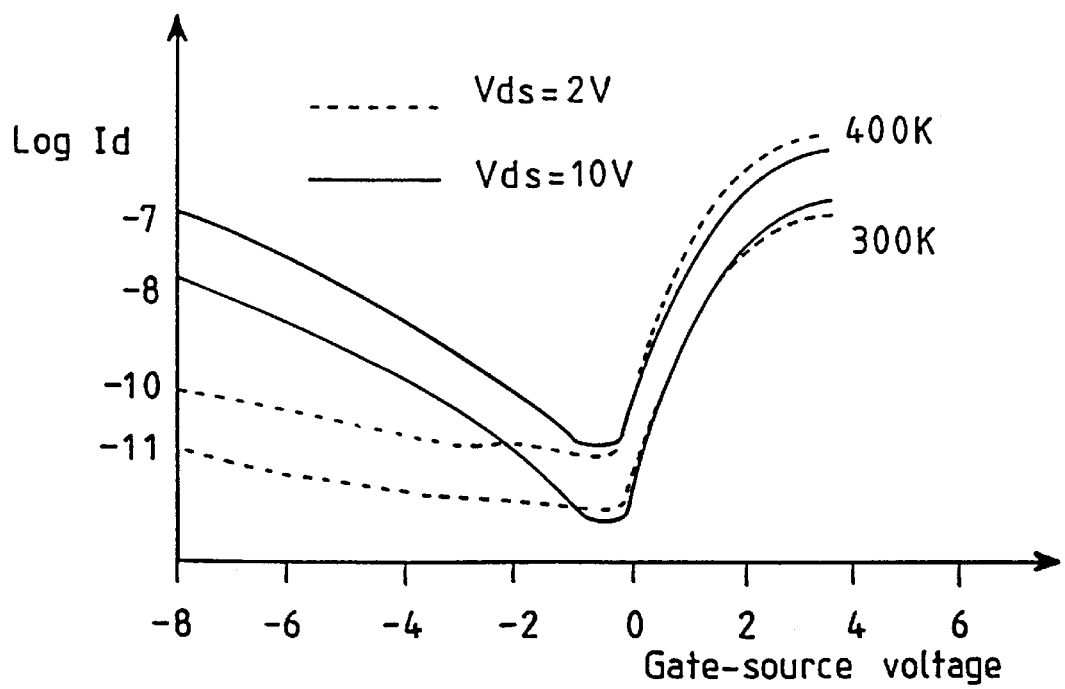
FIG 4: The leakage currents of typical polysilicon TFTs as a function of bias and temperature
PRIOR ART

ACTIVE MATRIX DISPLAY

BACKGROUND OF THE INVENTION

1. Field of the Invention

The invention relates to active matrix displays, for instance of the liquid crystal type using low temperature polycrystalline silicon thin film transistors as active elements within the matrix.

2. Description of the Related Art

A known type of active matrix display has active circuitry within a matrix of addressing lines in order to control the optical properties of a display material, such as liquid crystal. FIG. 1 of the accompanying drawings illustrates the structure of a typical active matrix display. A regular rectangular array of active matrix elements, such as 1, is arranged as rows addressed by a scan driver 2 and columns addressed by a data driver 3. The circuit of a typical picture element or pixel is illustrated at 4.

Each pixel comprises a display element (not shown) which is effectively in parallel with a hold capacitor 5. The hold capacitor 5 is connected between the source of a thin film field effect transistor 6 and a common supply line or to the previous gate line. The gate of the transistor 6 is connected to a scan electrode 8 which is common to all of the pixels of the row and which is connected to a respective output of the scan driver 2. The drain of the transistor 6 is connected to a data electrode 7 which is common to all of the pixels of the column and which is connected to a respective output of the data driver 3.

In use, rows of pixel display data are supplied by the data driver 3 to the data electrodes 7 in synchronism with scan pulses which are supplied by the scan driver 2 to the scan electrodes 8 in a cyclically repeating sequence. Thus, the rows of pixels are refreshed one at a time until all of the rows have been refreshed so as to complete refreshing of a frame of display data. The process is then repeated for the next frame of data.

When the scan electrode 8 of each pixel receives a scan pulse from the scan driver 2, the voltage on the data electrode 7 causes the hold capacitor 5 to be charged. When the scan pulse is removed, the transistor 6 isolates the hold capacitor 5 from the data electrode 7 so that the optical property of the associated display element corresponds to the voltage across the hold capacitor 5 until it is refreshed during the next frame.

In active matrix liquid crystal displays, the voltage stored on the hold capacitor 5 is used to modulate the optical properties of a thin layer of liquid crystal. In a known type of display, the transistors 6 forming switching elements are embodied as amorphous silicon thin film transistors. Between refresh cycles of each pixel, the dynamic behaviour of the voltage stored in the capacitor 5 is of considerable importance in determining the picture quality.

Most liquid crystal devices have a non-linear and time dependent relationship between the applied voltage and the surface charge present on the liquid crystal. This effect, known as dielectric anisotropy, implies that the effective capacitance of the liquid crystal device is a function of the applied voltage and the response time of the liquid crystal. In a conventional active matrix liquid crystal device pixel, the non-ideal liquid crystal capacitance Clc, shown at 9 in FIG. 2, is in parallel with a fixed storage capacitor Cs. When the pixel is addressed by supplying a scan pulse to the scan electrode 8, the gate voltage of the transistor 6 goes high for a relatively short time so as to allow the display to be refreshed sufficiently rapidly to avoid visible flicker. The charging time for the capacitance comprising the parallel combination of the capacitor 5 and the display element 9 is therefore sufficiently short for the voltage dependence of the liquid crystal capacitance Clc to have no substantial effect so that the capacitance Clc may be considered constant for the duration of the scan pulse.

However, during the interval between scan pulses, the transistor 6 substantially isolates the capacitor 5 and the display element 9 so that the charge across the parallel combination remains substantially constant. As the liquid crystal responds to the applied voltage, the capacitance Clc changes so that the final voltage across the display element is not equal to the amplitude of the charging pulse and does not therefore correspond to the data voltage which was supplied to the data electrode 7 during scanning of the pixel. In the case of a liquid crystal having positive dielectric anisotropy, the capacitance increases so that the voltage across the liquid crystal display element falls.

The effects of dielectric anisotropy are illustrated in FIGS. 3a to 3c of the accompanying drawings, each of which shows superimposed graphs of gate voltage and display transmission against time. FIG. 3a illustrates the liquid crystal response to a single scan pulse per refresh cycle. The voltage on the data line provides the gate voltage in the form of a relatively short pulse. The desired transmission value is indicated on the left hand vertical axis but the actual transmission characteristic of the liquid crystal display element is such that a lower than expected transmission is provided. In other words, as the liquid crystal responds to the voltage, the capacitance increases and the voltage across the liquid crystal decreases so that the transmission does not reach the desired value.

FIG. 3b corresponds to FIG. 3a but illustrates the effect of several refresh cycles of the pixel with the same data signal. In particular, three refresh cycles are shown. Thus, it is possible to achieve the desired transmission by applying a sequence of scan pulses to the pixel.

FIG. 3c, which corresponds to FIGS. 3a and 3b, illustrates the effect of charging the liquid crystal capacitance from a lower impedance voltage source. This can be achieved, for example, by switching the transistor 6 on for a longer period of time so that the hold capacitor 5 and the liquid crystal capacitance Clc are charged from the respective output of the data driver 3 which has a relatively low output impedance. The liquid crystal display element therefore achieves the desired transmission value but the rate at which the display can be refreshed is greatly reduced so that undesirable visual artefacts, such as flicker, becomes visible.

A known technique for reducing the effects of non-ideal capacitance is to make the capacitance Cs of the hold capacitor much greater than the non-ideal liquid crystal capacitance Clc. This approach is acceptable for typical nematic materials which typically have a surface charge density of $10^{-4}$ $C/m^2$. There are, however, liquid crystal modes which exhibit a much larger difference in surface charge density between switched states. To drive these materials using the conventional active matrix scheme would necessitate supplying this potentially large value of charge during the time that the scan line is high. Since there is not enough time for the liquid crystal material to respond during the scan time, this would require a very large storage capacitor, a very high data voltage and a conventionally sized capacitor, or a compromise between these methods. In general, it would be impractical to consider using the conventional active matrix scheme in such circumstances because the combinations of large capacitances and/or voltages would have a disadvantageous effect on the aperture ratio and power consumption of the display. Examples of such materials include liquid crystal devices with a spontaneous polarisation, such as surface stabilised ferroelectrics, or a field-induced spontaneous polarisation, such as electroclinics, helioelectrics, deformed helix ferroelectrics, antiferroelectrics, random phases, and columnars.

In addition to the effects of dielectric anisotropy, the effect of leakage current through the thin film transistor 6 may also give rise to undesirable visual artefacts. The leakage current is that current which flows across the transistor channel when the gate voltage is below the threshold voltage. Such a leakage current may cause the voltage stored in the hold capacitor 5 to decrease since the leakage current through the thin film transistor tends to allow the charges stored in the hold capacitor 5 tend to escape therefrom. Thus, if the leakage current is too high, then the voltage across the liquid crystal element decays significantly for the frame period. As a result, the transmission characteristics of the element will change significantly between refreshes so that the display produces visible flicker.

Recent advances in thin film transistor processing technology have resulted in the development of high performance polysilicon thin film transistors. In particular, it is now possible to fabricate such transistors at temperatures which are low enough to be compatible with the glass substrates used in displays. Further, such transistors can now be made with improved drive capability compared to conventional amorphous silicon thin film transistors and may therefore be used not only within each pixel of the display but also for high speed peripheral drive circuitry, such as in the drivers 2 and 3. The manufacturing cost of integrated displays may thus be reduced.

At the pixel level, polysilicon transistors may be made smaller than amorphous silicon transistors with the advantages that the aperture ratio can be improved and scan voltage feedthrough can be reduced. However, the leakage current of a polysilicon thin film transistor is much worse than that of an amorphous silicon thin film transistor. The off-state leakage represents one of the most variable parameters over a display panel and is highly dependent on the gate-source voltage and drain-source voltage of the transistors 6. These characteristics therefore represent a major problem in adopting polysilicon thin film transistors as switching elements in active matrix liquid crystal display panels.

FIG. 4 of the accompanying drawings shows graphs of drain current on a logarithmic scale against gate-source voltage for two different device temperatures and two different drain-source voltages. Decreasing the drain-source voltage provides an exponential reduction in the leakage current at all temperatures. Thus, as is known, it is possible to reduce leakage current by field reduction at the drain of the transistor. F. Okumura and K. Sera, A.M.L.C.D., p24–27 (1994) discloses several techniques for achieving this, such as Lightly Doped Drain (LDD) Structures, Offset Gate (OG) Structures, Active Gates (AG) and Multiple Gates.

LDD and OG structures reduce the field at the drain but also have a deleterious effect on the on-state current and hence the speed of such devices. This is not ideal for integrated displays because it requires different processes to be used for the pixel transistors, where off-current is crucial, and for the drivers, where high speeds are crucial. The use of extra processing steps is undesirable and may increase the cost of manufacture.

An alternative technique is the use of multiple gates which amounts to using two or more thin film transistors in series as illustrated in FIG. 5 of the accompanying drawings. The single gate transistor 6 of the arrangement shown in FIGS. 1 and 2 is replaced by a multiple gate transistor equivalent to the transistors 6a and 6b of FIG. 5. However, there may not be sufficient field reduction across the devices to prevent excess leakage current so that this technique has often been applied together with the LDD technique.

Another known technique shown in FIG. 6 of the accompanying drawings is to use an additional hold capacitor 10 at the junction of the multiple gate structure, which is effectively between the transistors 6a and 6b. However, it is doubtful whether such an arrangement will provide sufficient hold times to allow the use of polysilicon thin film transistors in displays without undesirable visual artefacts.

FIG. 7 of the accompanying drawings illustrates another technique for extending the hold time over several frames as disclosed in Japanese laid-open Patent Application No. 5-142573. This technique involves "boot-strapping" by connecting a unity voltage gain amplifier 11 with its input to the capacitor 5 and the display element 9 and its output to the junction between the transistors 6a and 6b. In other words, the circuit of FIG. 7 is provided with a feedback function through the unity voltage gain amplifier 11, so that the voltage across the capacitor 5 and the display element 9 appears at the junction of the series-connected thin film transistors 6a and 6b. If the buffer amplifier 11 were ideal and drew no charge from the capacitor 5 and the capacitance of the display element 9, leakage from the liquid crystal would be eliminated.

EP 0 586 155 discloses an active matrix liquid crystal display as shown in FIG. 8a of the same general type so that shown in FIG. 1. However, the active circuitry for each pixel differs in that there is provided a buffer amplifier 11 having unity voltage gain. The input of the amplifier 11 is connected to the source of the transistor 6 and to the hold capacitor 5 whereas the output of the amplifier 11 is connected to the liquid crystal display element 9. The amplifier 11 has a very high input impedance and a relatively low output impedance.

When the pixel is addressed by applying a scan pulse to the scan electrode 8, the transistor 6 is switched on so that the hold capacitor 5 charges to the voltage which is present on the data electrode 7. Between scan pulses on the electrode 8, the transistor 6 is switched off. The output of the amplifier 11 follows the voltage across the capacitor 5 and supplies this voltage to the display element 9.

The output impedance of the amplifier 11 is relatively low so that the display element 9 is effectively voltage driven. Accordingly, the voltage across the display element 9 remains substantially constant. The liquid crystal is therefore subjected to a voltage step which is applied for the entire frame refresh time.

Although EP 0 586 155 is concerned with overcoming the effect of current leakage between the electrodes of the display element 9 which would cause the voltage across the display element to fall between consecutive refreshes, the effect of liquid crystal dielectric anisotropy would also be substantially reduced or eliminated.

However, the technique disclosed in EP 0 586 155 may not sufficiently reduce the leakage current through the thin film transistor 6, resulting in an undesirable decrease in the voltage across the hold capacitor 5 which in turn leads to an decrease in the voltage across the display element 9.

Specifically, in the circuit of EP 0 586 155 as illustrated in FIG. 8a, the buffer amplifier 11 causes the voltage across the display element 9 to be set equal to the voltage across the hold capacitor 5, so that the voltage across the display element 9 remains unchanged irrespective of the dielectric anisotropy of the liquid crystal material. However, the charges stored in the hold capacitor 5 can "escape" therefrom through the transistor 6 due to the leakage current flowing through the transistor 6, resulting in the voltage across the hold capacitor being reduced. As a result, the voltage across the display element 9 is reduced.

SUMMARY OF THE INVENTION

According to the invention, there is provided an active matrix display comprising a plurality of picture elements, each of which comprises a gate having a data input connected to a data electrode and a scan input connected to a scan electrode, a hold capacitor connected to the output of the gate, a buffer amplifier having an input connected to the hold capacitor, and a display element connected to the output of the buffer amplifier, characterised in that the gate comprises first and second semiconductor switches connected in series and in that the output of the amplifier is connected to a circuit node between the first and second switches.

It is thus possible to provide a display in which the undesirable effects of leakage currents of semiconductor devices as well as of liquid crystal dielectric anisotropy are substantially reduced or eliminated. Specifically, the adverse effect of the leakage current through the semiconductor switches are substantially reduced or eliminated. The refresh speed of the display may be increased and visual artefacts such as flicker can be reduced. For display elements using other technologies, the hold capacitor is substantially isolated from any undesirable effects which might otherwise be caused by the display element. The semiconductor devices may be made using the same processing steps at the pixels and at drivers integrated with the display so that manufacturing costs are not substantially increased.

Each of the display elements may comprise a liquid crystal display element.

The amplifier may comprise polysilicon active devices. The active devices may comprise polysilicon thin film transistors.

The amplifier preferably has unity voltage gain.

Each of the first and second switches may comprise a transistor.

The amplifier may comprise a source follower. The source follower may have a constant current source load, i.e., a load allowing a current flow of a constant level to be maintained.

The amplifier may comprise a differential amplifier having a non-inverting input connected to the hold capacitor and an inverting input connected to the output. The differential amplifier may comprise first and second transistors having a common source load. The common source load may be a constant current generator. The amplifier may comprise a current mirror connected to the drains of the first and second transistors.

The picture elements may be arranged as a plurality of rows with the scan inputs of the picture elements of each row being connected to a respective common scan electrode, the amplifiers of the picture elements of each row having power supply terminals connected between the common scan electrodes of an adjacent pair of rows. The picture elements of adjacent rows may comprise semiconductor devices of opposite conductivity types.

In a preferred embodiment of the invention, an active buffer is provided at each pixel in an active matrix display. The active buffer is disposed between a hold capacitor at the input and a liquid crystal cell at the output. Further, a feedback loop is connected from the output of the buffer to a junction of two series-connected polysilicon thin film transistors which act as pass gates from a data line to the hold capacitor. The hold capacitor, which can be of relatively small value, is charged during each row scan period and provides a voltage reference to the input of the buffer. The buffer then drives the liquid crystal cell for the remainder of the frame period with a constant voltage. Using this arrangement, it is possible to drive materials with very high surface charge density values since the charge is supplied from the buffer over a very much longer time period. The need to use high voltages and/or large hold capacitors is therefore eliminated with consequent benefits in terms of power consumption and/or aperture ratio. The output of the buffer is connected to the midpoint of the transistors in order to "boot strap" the inner thin film transistor, which is connected closely to the liquid crystal element of the display element. In other words, set the voltage at the midpoint of the transistors to be substantially equal to the output voltage of the buffer. The active buffer tracks the voltage on the hold capacitor and simultaneously drives the liquid crystal capacitance and the junction between the pass transistors. Under this condition, with an ideal buffer, the drain-source voltage of the inner transistor is substantially zero and hence the leakage current through the inner transistor is substantially eliminated.

Thus, the invention described herein makes possible the advantage of providing an active matrix display in which the adverse effect of the dielectric anisotropy of the liquid crystal material on a displayed image, as well as the adverse effect of the leakage current through the semiconductor switches on the displayed image, are substantially reduced or eliminated.

These and other advantages of the present invention will become apparent to those skilled in the art upon reading and understanding the following detailed description with reference to the accompanying figures.

BRIEF DESCRIPTION OF THE DRAWINGS

FIGS. 3a to 3c illustrate the effects of liquid crystal dielectric anisotropy for different gating waveforms;

FIG. 4 illustrates leakage current against bias voltage for a typical polysilicon thin film transistor;

DESCRIPTION OF THE PREFERRED EMBODIMENTS

Figure 1:
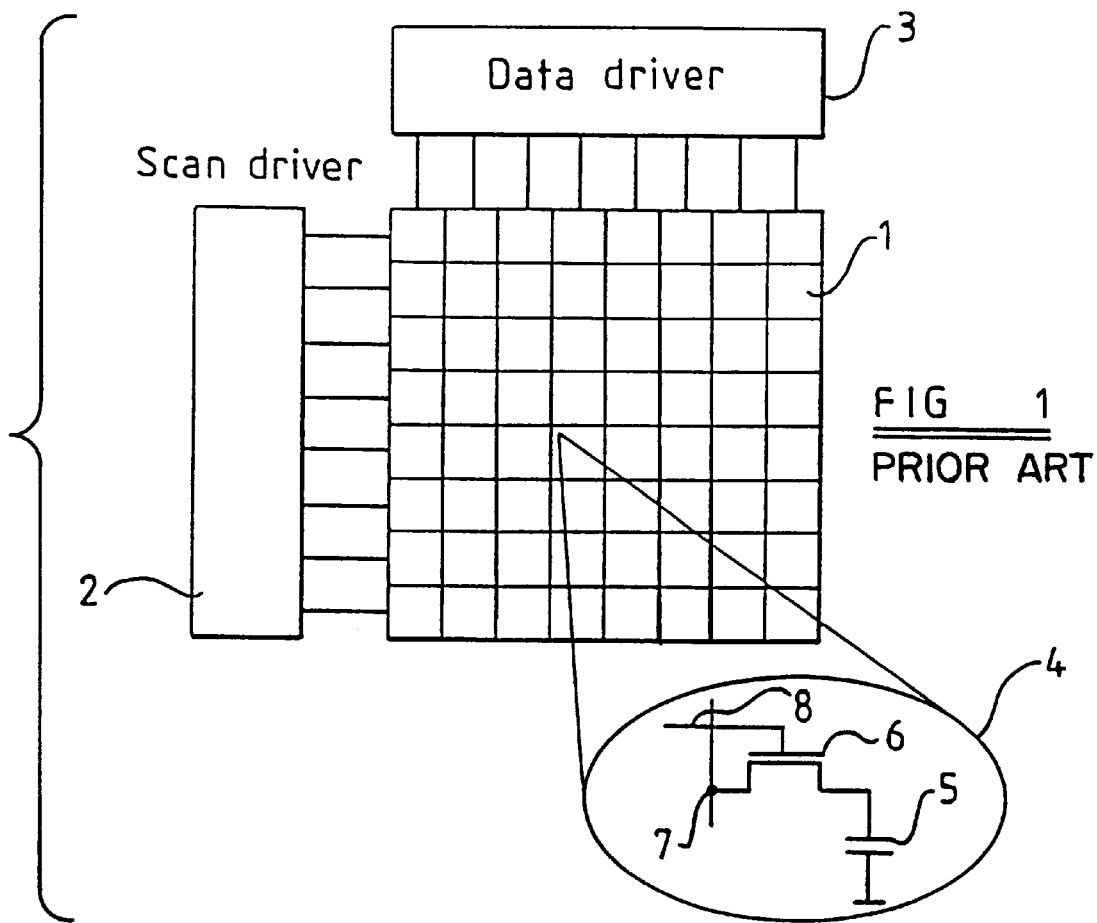
FIG. 1 is a schematic diagram of a known active matrix display.
Figure 2:
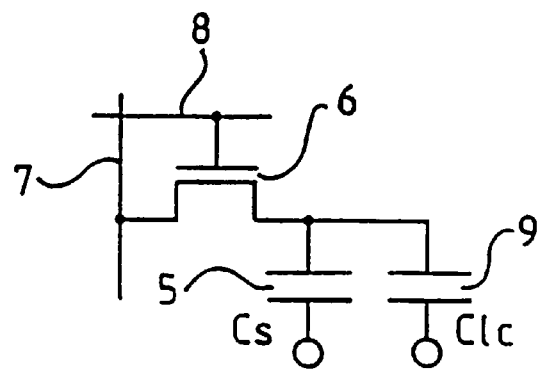
FIG. 2 is a diagram of an active matrix element of the display of FIG. 1.

The invention will be further described, by way of example, with reference to the accompanying drawings, in like reference numerals refer to like parts throughout the drawings.

Figure 5:
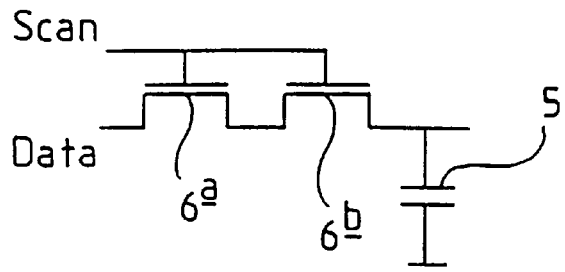
FIG. 5 is a diagram illustrating a first known modification of an active matrix display for reducing leakage current.
Figure 6:
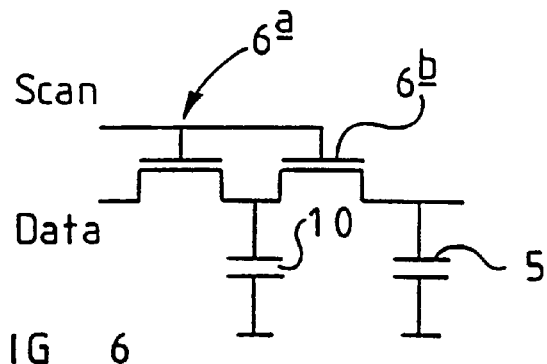
FIG. 6 is a diagram illustrating a second known technique for reducing leakage current.
Figure 7:
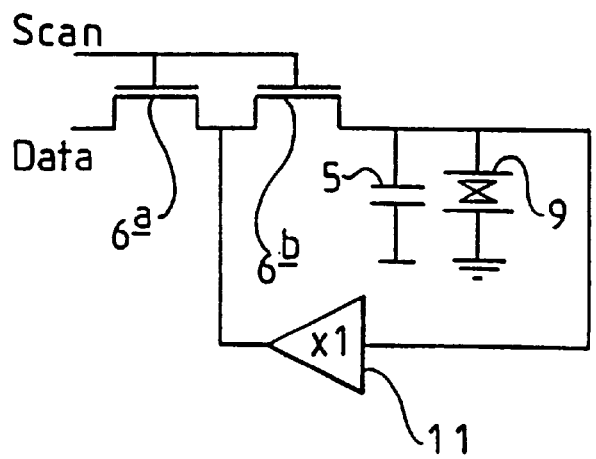
FIG. 7 is a diagram illustrating a third known technique for reducing leakage current.
Figure 8A:
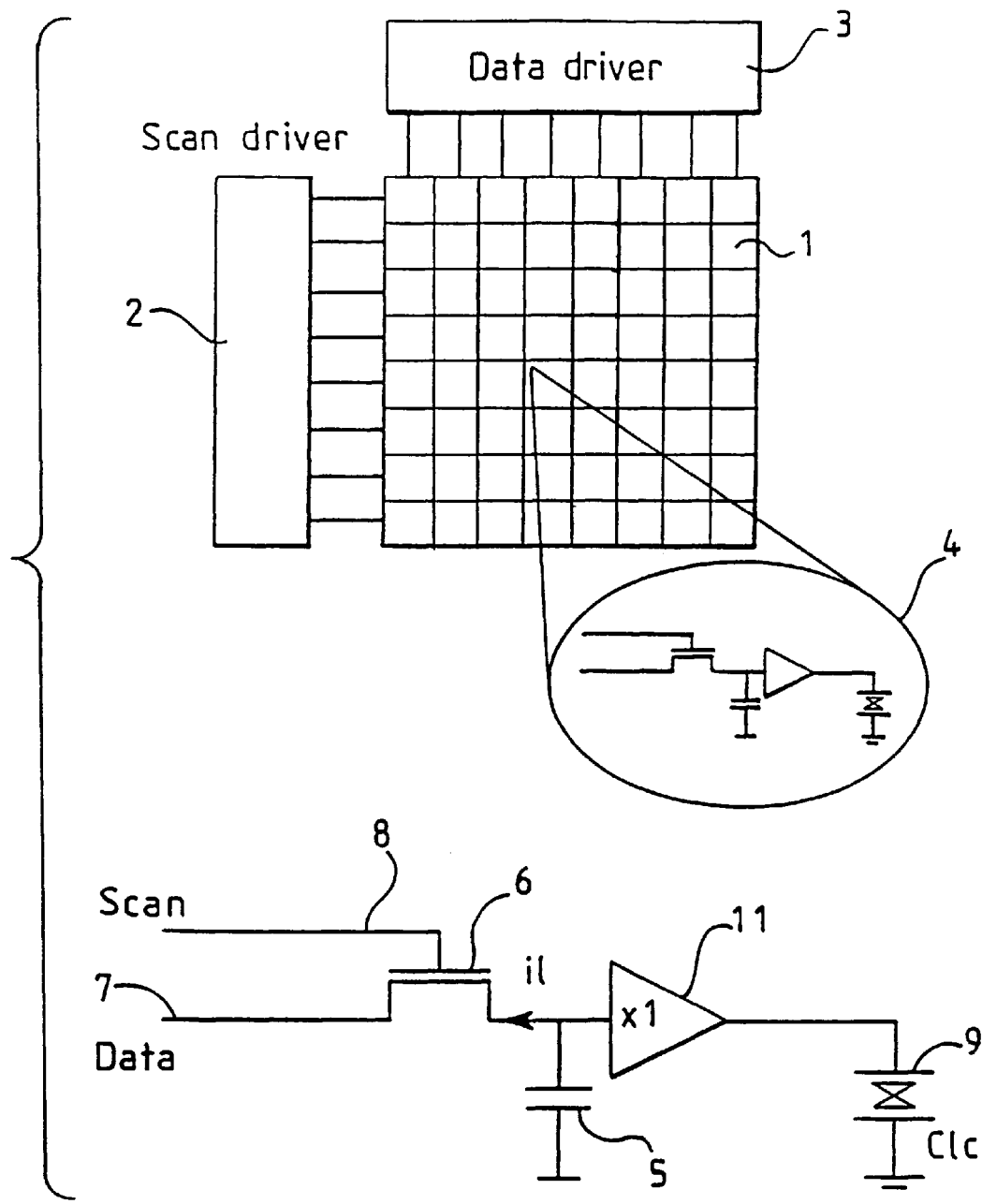
FIG. 8a is a schematic diagram of another known active matrix display.
Figure 8B:
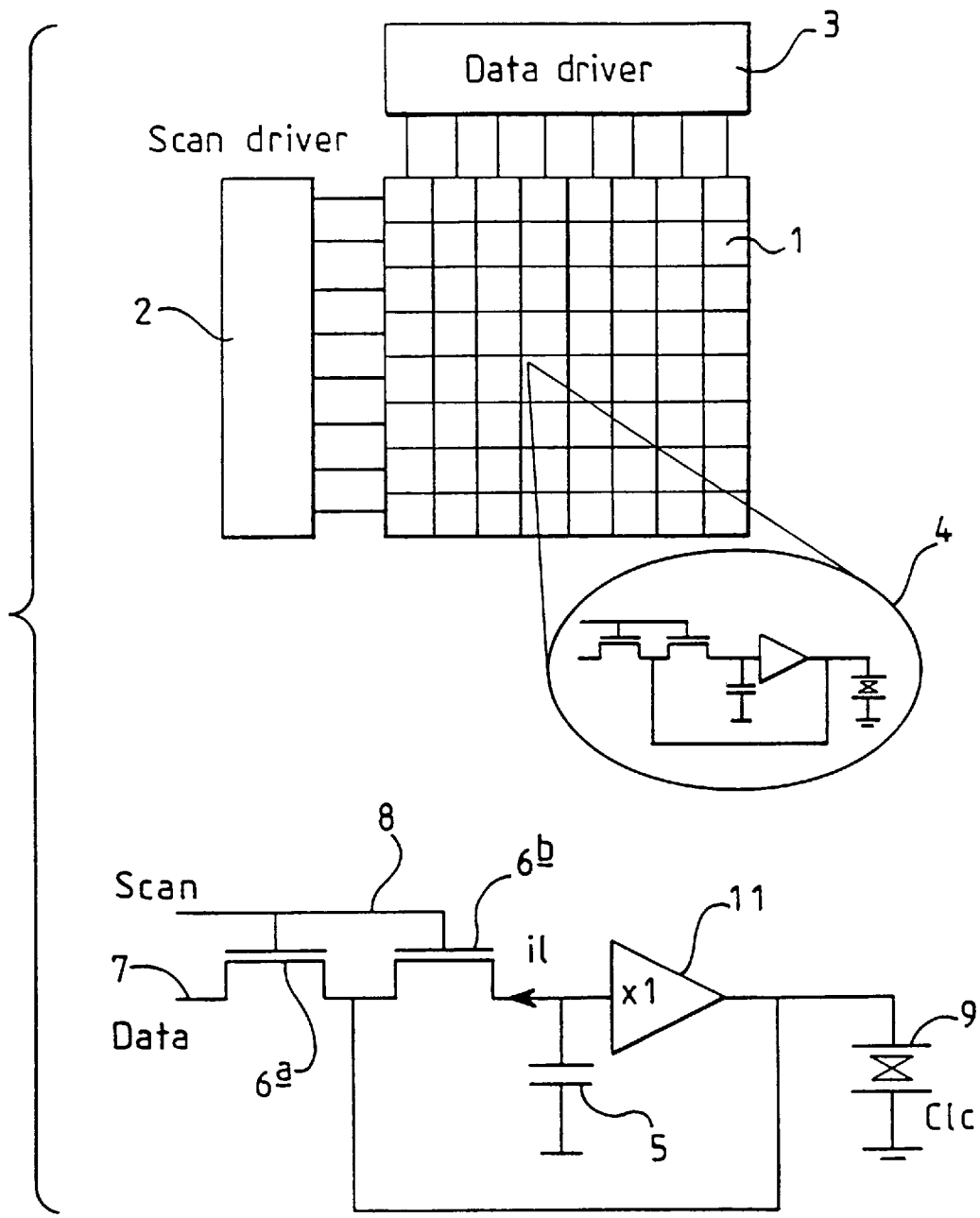
FIG. 8b is a schematic diagram of an active matrix liquid crystal display constituting an embodiment of the present invention.

The active matrix liquid crystal display shown in FIG. 8*b* differs from that shown in FIG. 8*a* in that the transistor 6 is replaced by series-connected transistors 6*a* and 6*b*, for instance of the multiple gate type shown in FIGS. 5 to 7. However, the output of the amplifier 11 is connected to the connection between the source of the transistor 6*a* and the drain of the transistor 6*b*.

The connection between the source of the transistor 6*a* and the display amplifier 11 provides a path for initial charging from the data line. After scanning of the line containing the pixel, the output of the amplifier 11, and hence the drain of the transistor 6*b*, are at the same voltage as the capacitor 5. Thus, the amplifier 11 causes the voltage across the display element 9 to be kept equal to the voltage across the hold capacitor 5. As a result, the voltage across the display element 9 remains unchanged irrespective of the dielectric anisotropy of the liquid crystal material. Since the drain voltage of the inner transistor 6*b*, provided closely to the display element 9, is forced to be set at a level equal to that of the output of the amplifier 11, the source-drain voltage across the transistor 6*b* is substantially equal to zero so that the leakage current 11 through the transistor 6*b* is substantially equal to zero. Therefore, a decrease in the voltage across the hold capacitor 5, which is typically derived from the leakage current through the switching device in the conventional technique, is prevented, so that the adverse effect of the leakage current on a displayed image is substantially reduced or eliminated.

There are a number of possible implementations of the unity gain buffer amplifier 11 and the choice will be dependent on a number of considerations including area, efficiency and fault tolerance.

Figure 9:
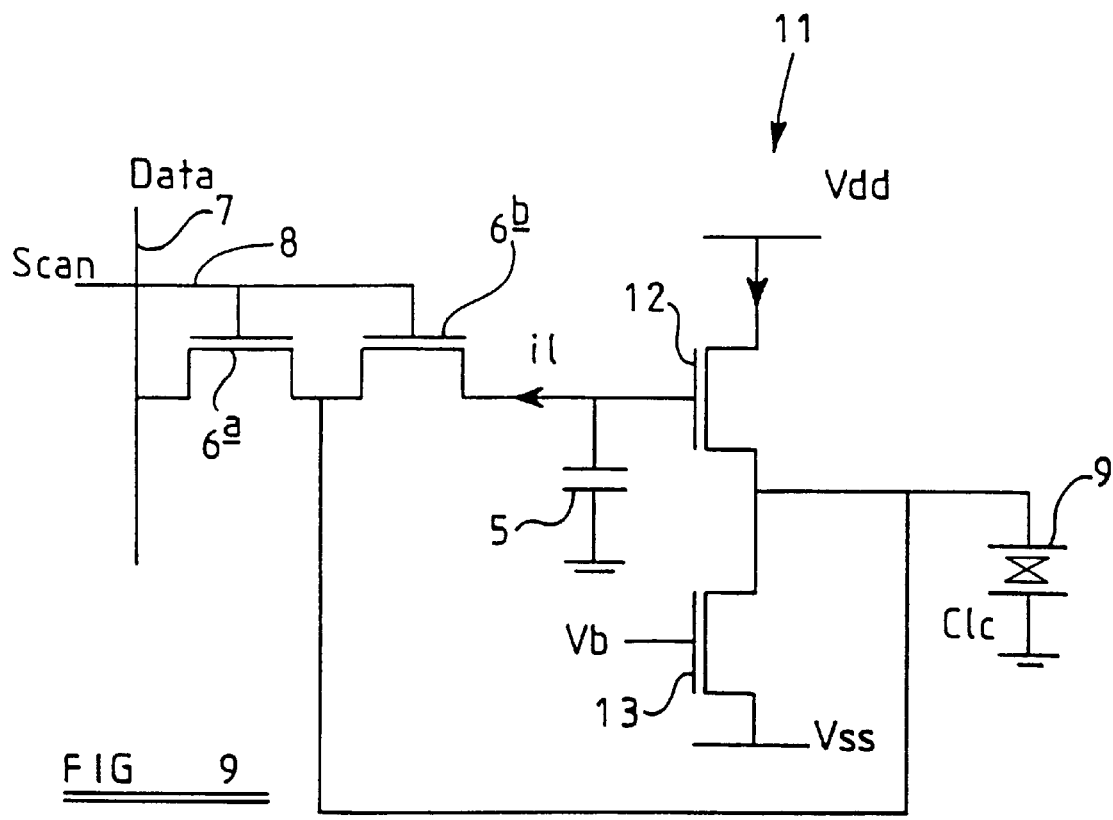
FIGS. 9, 10, 11 are circuit diagrams showing different types of amplifiers for use in the displays of FIG. 8.

FIG. 9 illustrates one type of buffer amplifier 11 in the form of a source-follower. The source follower comprises enhancement transistors 12 and 13 connected in series between supply lines Vdd and Vss. The gate of the transistor 12 forms the input of the amplifier connected to the capacitor 5 whereas the source of the transistor 12 forms the output of the amplifier. The gate of the transistor 13 is connected to a bias voltage Vb and forms a constant current source load for the transistor 12.

The current requirements of the source follower shown in FIG. 9 are extremely small since it is only required to supply the current required to track changes in the capacitance Clc of the liquid crystal display element 9 and the current necessary to compensate leakage.

Figure 10:
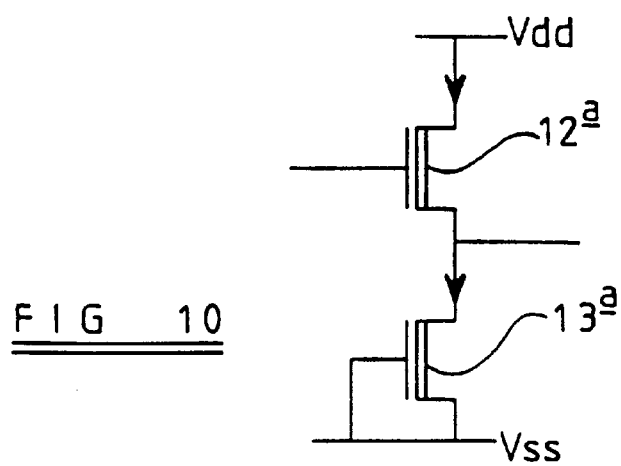

As shown in FIG. 10, the source-follower may be embodied by means of depletion transistors 12*a* and 13*a*. In this case, the gate of the transistor 13*a* is connected to the source so as to form the constant current generator. Thus, the bias voltage Vb is not required so that an extra supply wire is avoided.

Figure 11:
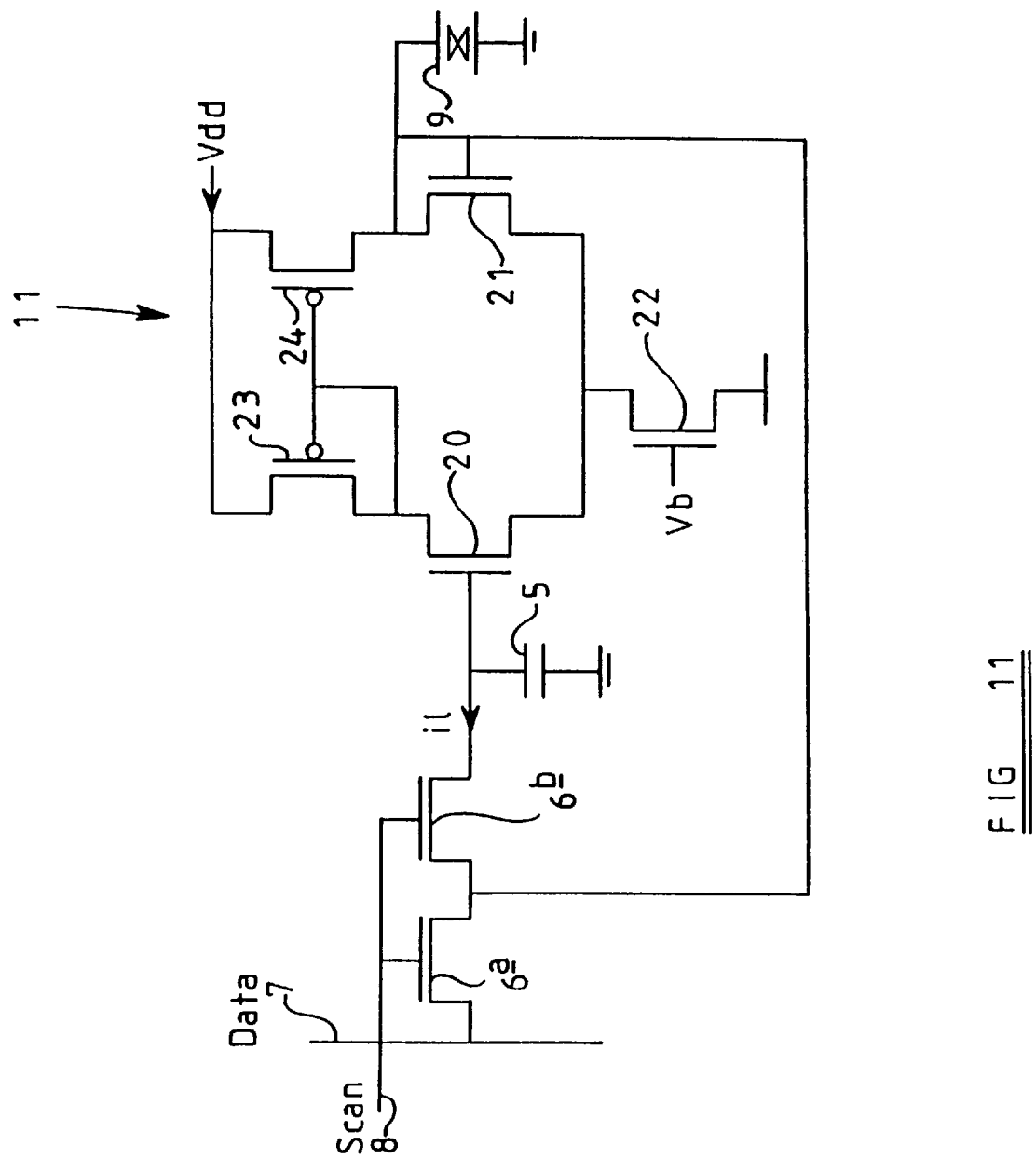

FIG. 11 shows another type of unity gain buffer amplifier based on a differential amplifier using polysilicon enhancement thin film transistors. The amplifier comprises differential input transistors 20 and 21 in the form of a "long-tail pair" and a current source comprising a transistor 22 whose gate is connected to receive a bias voltage Vb. The drain of the transistor 20 is connected to the input of a current mirror whose output is connected to the drain of the transistor 21. The current mirror comprises transistors 23 and 24 of opposite conduction type to the transistors 20 to 22.

The non-inverting input of the differential amplifier comprises the gate of the transistor 20 which is connected to the hold capacitor 5. The gate of the transistor 21 forms an inverting input which is connected to the output of the amplifier formed by the connection between the drains of the transistors 21 and 24. The transistors are run at subthreshold currents so that the closed loop gain of the amplifier is very close to unity. During operation between scan pulses, the voltage difference across the channel of the transistor 6*b* is equal to the input offset voltage of the amplifier 11 and this is of very small value.

Figure 12:
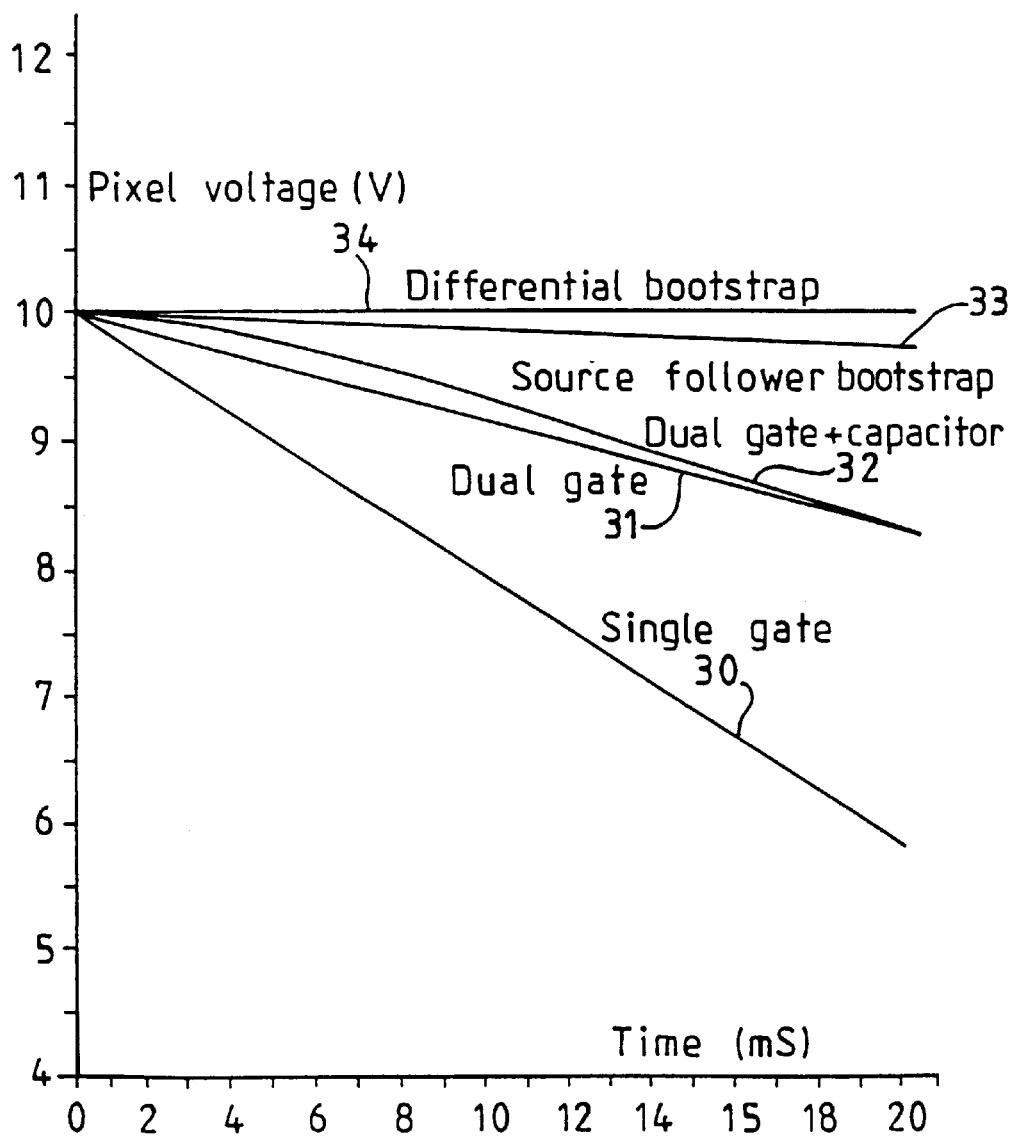
FIG. 12 is a graph of pixel voltage against time in milliseconds illustrating the effects of leakage current for different active matrix pixel circuits.

FIG. 12 illustrates the hold capacitor voltage decay against time for the arrangement described hereinbefore. Curve 30 illustrates the performance of the circuit shown in FIG. 1 and illustrates that the pixel voltage decays relatively rapidly. For a standard video display with a frame refresh period of the order of 20 milliseconds, the pixel voltage decays from the nominal 10 volts to approximately 6 volts. Curve 31 illustrates the performance of the circuit shown in FIG. 5 whereas curve 32 illustrates the performance of the circuit shown in FIG. 6. In the 20 millisecond refresh period, the pixel voltage decays from 10 volts to approximately 8.5 volts. These voltage decays result in perceptible visual artefacts.

Curve 33 illustrates the performance of the circuits shown in FIGS. 8*b*, 9 and 10 and illustrates that the voltage decay during the refresh period is relatively small and less than 0.5 volts. Curve 34 illustrates the performance of the circuit shown in FIG. 11, for which the pixel voltage decays by a negligible amount during the 20 millisecond refresh period.

It is thus possible to provide an active matrix display in which the effects of liquid crystal dielectric anisotropy are substantially eliminated so that there are no perceptible visual artefacts in the display. The effects of gating transistor leakage current are greatly reduced or substantially eliminated. It is possible to use polysilicon thin film transistors in the active circuitry at each pixel and in the scan and data drivers 2 and 3 so that all the circuitry is made using the same manufacturing process steps and no extra processing steps are necessary during manufacture.

A possible disadvantage of the presence of the buffer amplifiers 11 at the pixels is the need to provide supply voltages to the supply lines Vdd and Vss. Any extra wiring could have a significant effect on the aperture ratio of high resolution displays and would introduce a greater risk of bridging faults within the electrode matrix. However, FIG. 13 illustrates an arrangement which makes additional wiring unnecessary.

Figure 13:
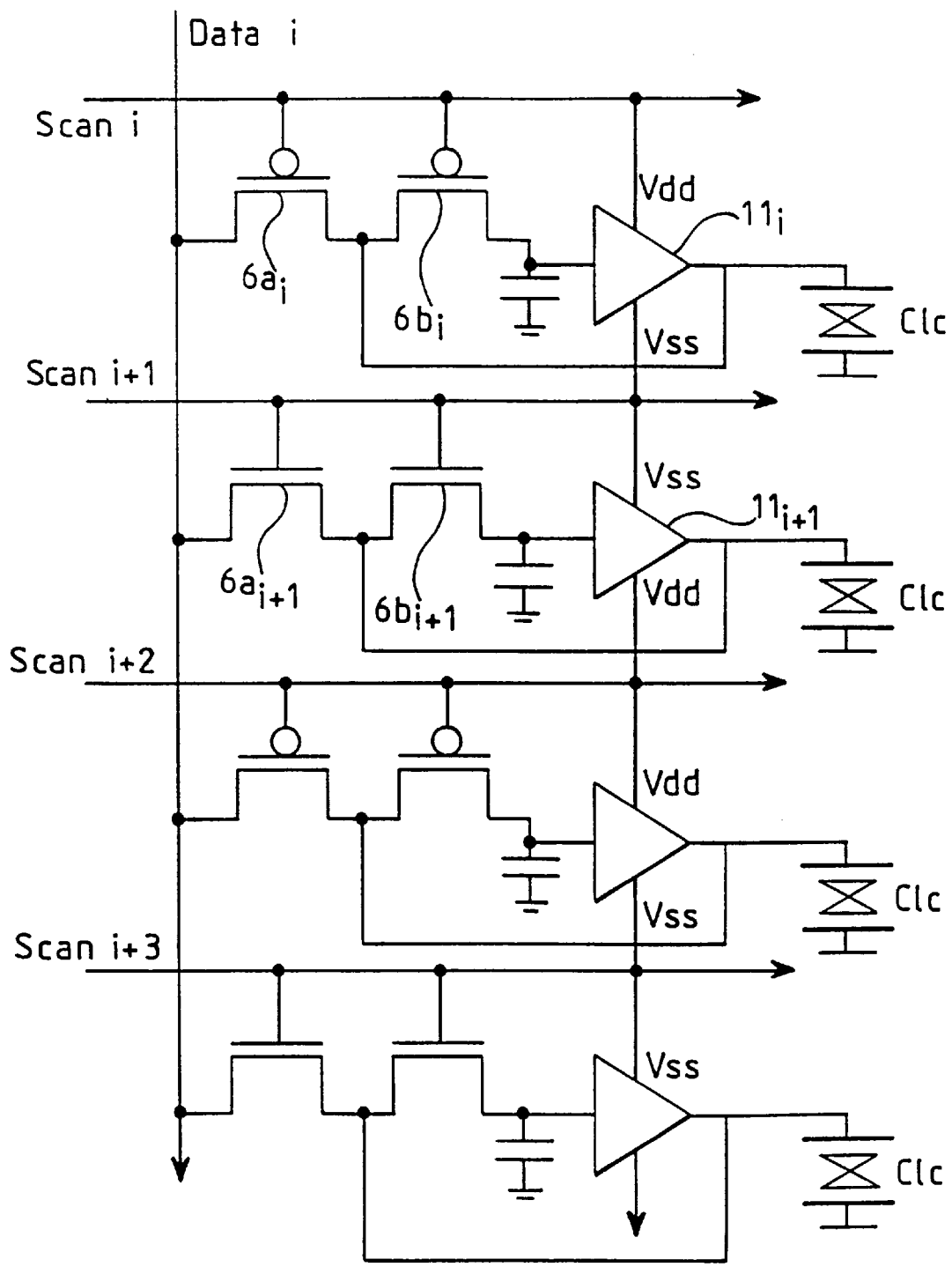
FIG. 13 is a diagram illustrating the use of scan lines to power active circuitry at the pixels.

FIG. 13 shows part of one column of pixels of an active matrix display. Each pixel is of the type illustrated in FIG. 8*b*. However, the polarities of the active devices of the pixel in adjacent rows are opposite. Thus, the transistors $6a_i$ and $6b_i$ are of p type, the transistors $6a_{i+1}$ and $6b_{i+1}$ are of n type, and so on. For the p type gate transistors such as $6a_i$ and $6b_i$, the transistors are on when the scan line i is negative and are off when the scan line i is positive. For the n type transistors such as $6a_{i+1}$ and $6b_{i+1}$, the transistors are on when the scan line i+1 is positive and off when the scan line is negative. Thus, alternate scan lines are negative in the absence of a scan pulse whereas the remaining scan lines are positive in the absence of a scan pulse. The scan lines can thus be used to supply power to the amplifiers $11_i$, $11_{i+1}$ with the amplifier supply lines Vdd and Vss connected as shown in FIG. 13. The active circuitry at each pixel is thus powered whenever the scan lines above and below the cell are in their quiescent state i.e. during the whole time between refreshing of the corresponding pixel rows. It is therefore possible to power the amplifiers without the need for extra wiring.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix display comprising:

a plurality of picture elements, each of which comprises a gate having a data input, a scan input and an output, the data input being connected to a data electrode, the scan input being connected to a scan electrode;

a hold capacitor connected to the output of the gate;

a buffer amplifier having an input and an output, the input being connected to the hold capacitor; and a display element connected to the output of the buffer amplifier, wherein the gate comprises first and second semiconductor switches connected in series and wherein the output of the amplifier is connected to a circuit node between the first and second switches, and the picture elements are arranged as a plurality of rows with the scan inputs of the respective picture elements of each row being connected to a respective common scan electrode, the amplifiers of the picture elements of each row having power source supply terminals connected between the common scan electrodes of an adjacent pair of rows.

2. The display of claim 1, wherein the gates of the picture elements of adjacent rows comprise semiconductor devices of opposite conductivity types.

3. The display of claim 1, wherein the amplifier comprises a source follower.

4. The display of claim 3, wherein the source follower has a constant current source lead.

5. An active matrix display comprising:

a plurality of picture elements, each of which comprises a gate having a data input, a scan input and an output, the data input being connected to a data electrode, the scan input being connected to a scan electrode;

a hold capacitor connected to the output of the gate;

a buffer amplifier having an input and an output, the input being connected to the hold capacitor; and a display element connected to the output of the buffer amplifier, wherein the gate comprises first and second semiconductor switches connected in series and wherein the output of the amplifier is connected to a circuit node between the first and second switches, the amplifier comprises a differential amplifier having a non-inverting input connected to the hold capacitor and an inverting input connected to the output, the differential amplifier comprising first and second transistors having a common source load, and the output of the amplifier is connected to the display element independent of scan pulses provided to the scan input.

6. The display of claim 5, wherein each display element comprises a liquid crystal display element.

7. The display of claim 5, wherein the gate and the amplifier comprise polysilicon active devices.

8. The display of claim 7, wherein the active devices comprise polysilicon thin film transistors.

9. The display of claim 5, wherein the amplifier has unity voltage gain.

10. The display of claim 5, wherein each of the first and second switches comprises a transistor.

11. The display of claim 5, wherein the common source load is a constant current generator.

12. The display of claim 5, wherein the amplifier comprises a current mirror connected to the drains of the first and second transistors.

13. The display of claim 5, wherein the output of the buffer amplifier is connected directly to the display element.

* * * * *